United States Patent [19]

Martin et al.

[11] Patent Number: 5,675,395
[45] Date of Patent: Oct. 7, 1997

[54] REMOTE RECEIVER THAT COORDINATES COMMAND SIGNALS FROM DIFFERING SOURCES INCLUDING RADIO FREQUENCY AND INFRARED SOURCES

[75] Inventors: Jeffrey Alan Martin, Escondido; Toshikazu Ido, San Diego, both of Calif.

[73] Assignees: Sony Corporation, Tokyo, Japan; Sony Electronics, Inc., Park Ridge, N.J.

[21] Appl. No.: 368,331

[22] Filed: Jan. 4, 1995

[51] Int. Cl.$^6$ .................................................. H04N 5/44
[52] U.S. Cl. .................. 348/734; 348/585; 348/725; 340/825.73; 250/339.05; 359/145
[58] Field of Search .................. 348/706, 734, 348/585, 598, 164, 725; 359/145, 146; 340/825.69, 825.73, 825.74, 825.76; 455/151.2; 250/339.01, 339.05; H04N 5/44

[56] References Cited

U.S. PATENT DOCUMENTS

| | | | |
|---|---|---|---|
| 4,455,487 | 6/1984 | Wendt | 250/339.05 |
| 4,904,993 | 2/1990 | Sato | 340/825.69 |
| 5,001,558 | 3/1991 | Burley et al. | 348/164 |
| 5,138,649 | 8/1992 | Krisbergh et al. | 359/146 |
| 5,307,193 | 4/1994 | Vanzeeland et al. | 354/145 |

Primary Examiner—John K. Peng
Assistant Examiner—Jeffrey S. Murrell
Attorney, Agent, or Firm—Blakely, Sokoloff, Taylor & Zafman

[57] ABSTRACT

A remote receiver is disclosed that accepts command signals from infrared transmitters and radio frequency transmitters and that combined the command signals into a final non overlapping command signal according to a preselected priority among the command signals.

25 Claims, 4 Drawing Sheets

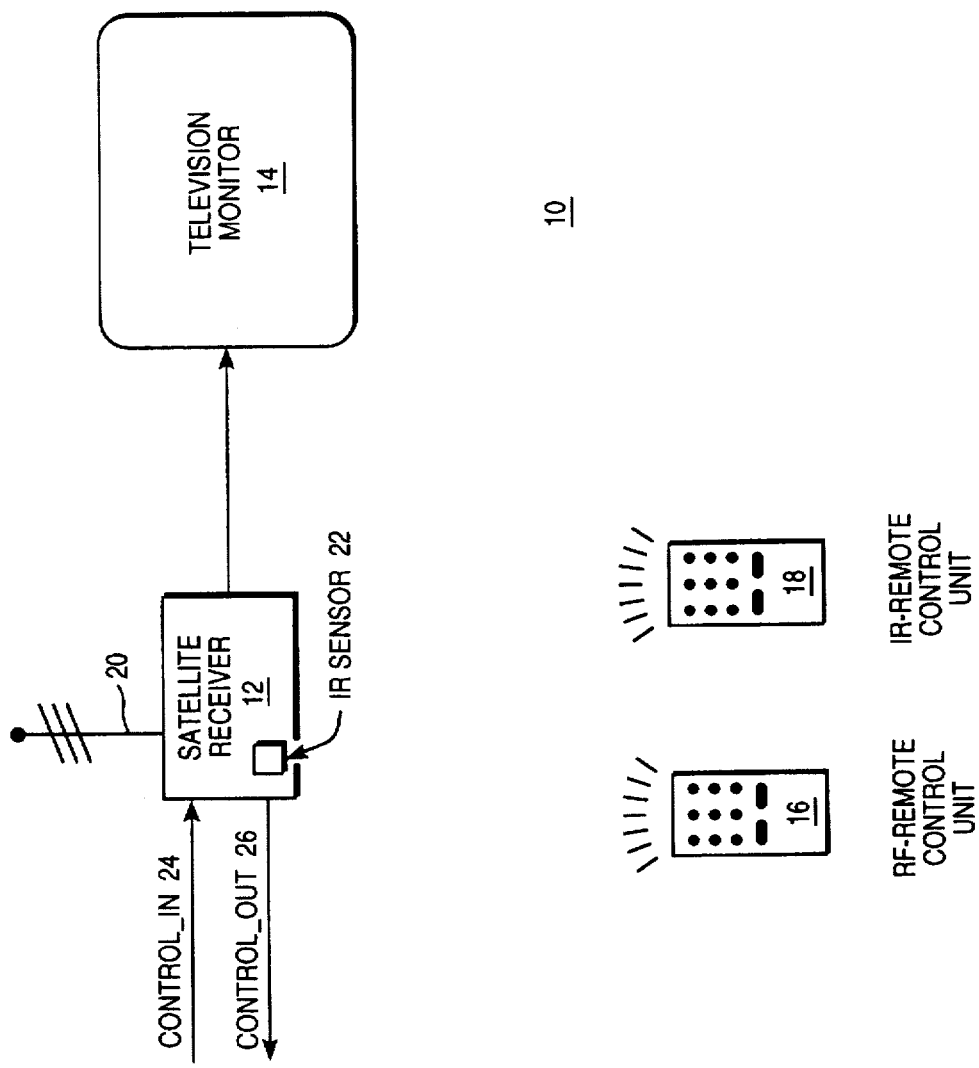

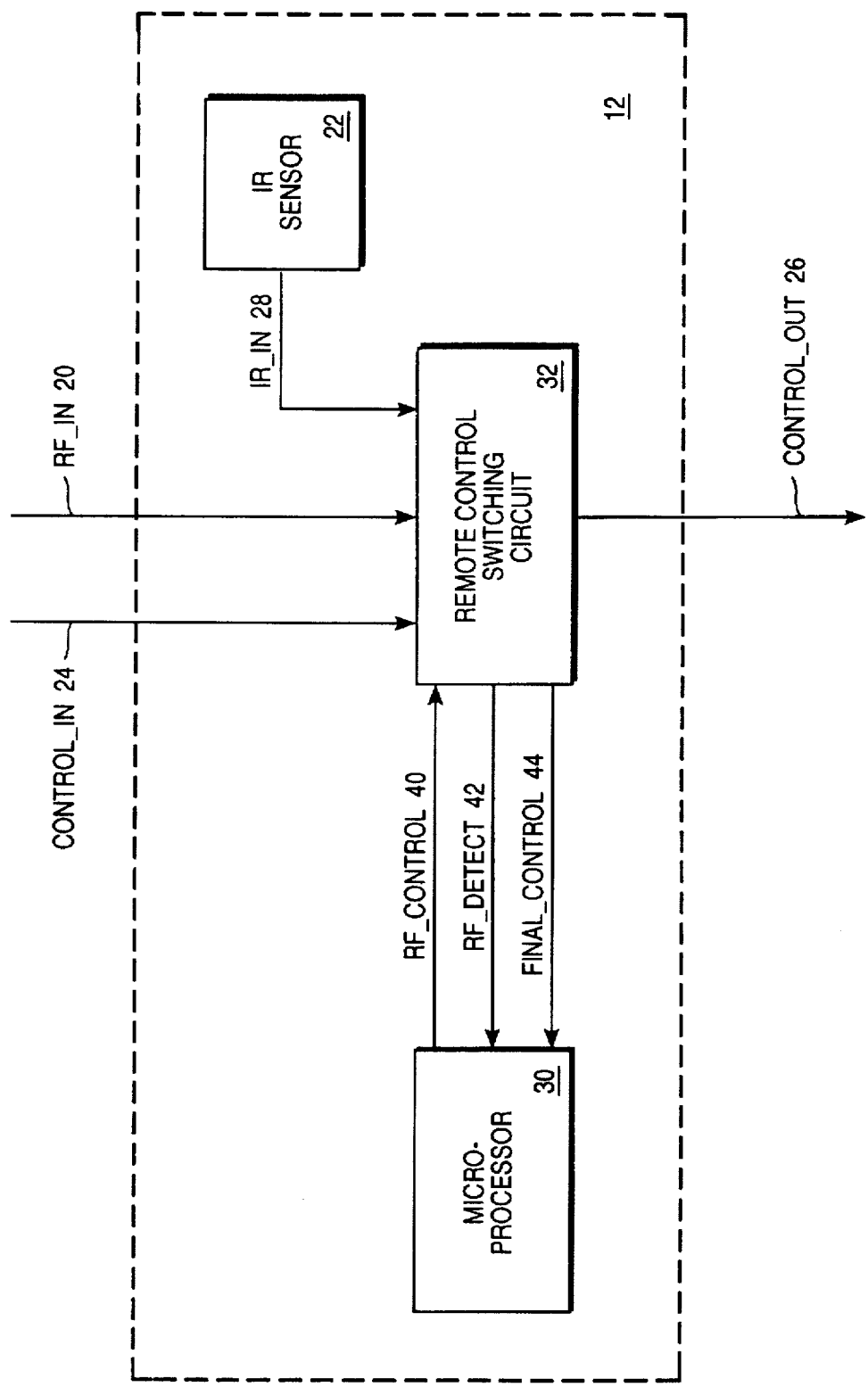
FIG_2

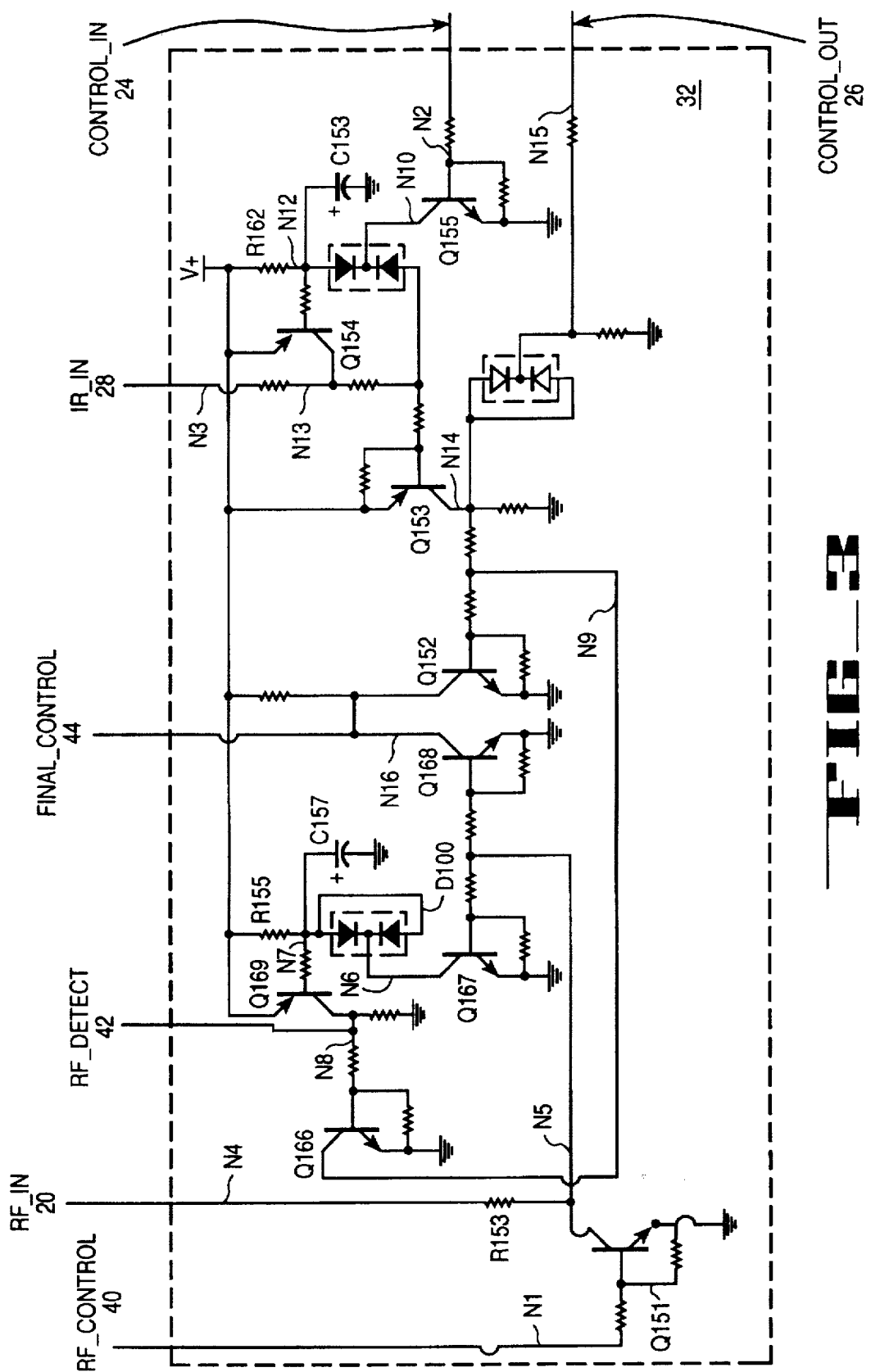
FIG_3

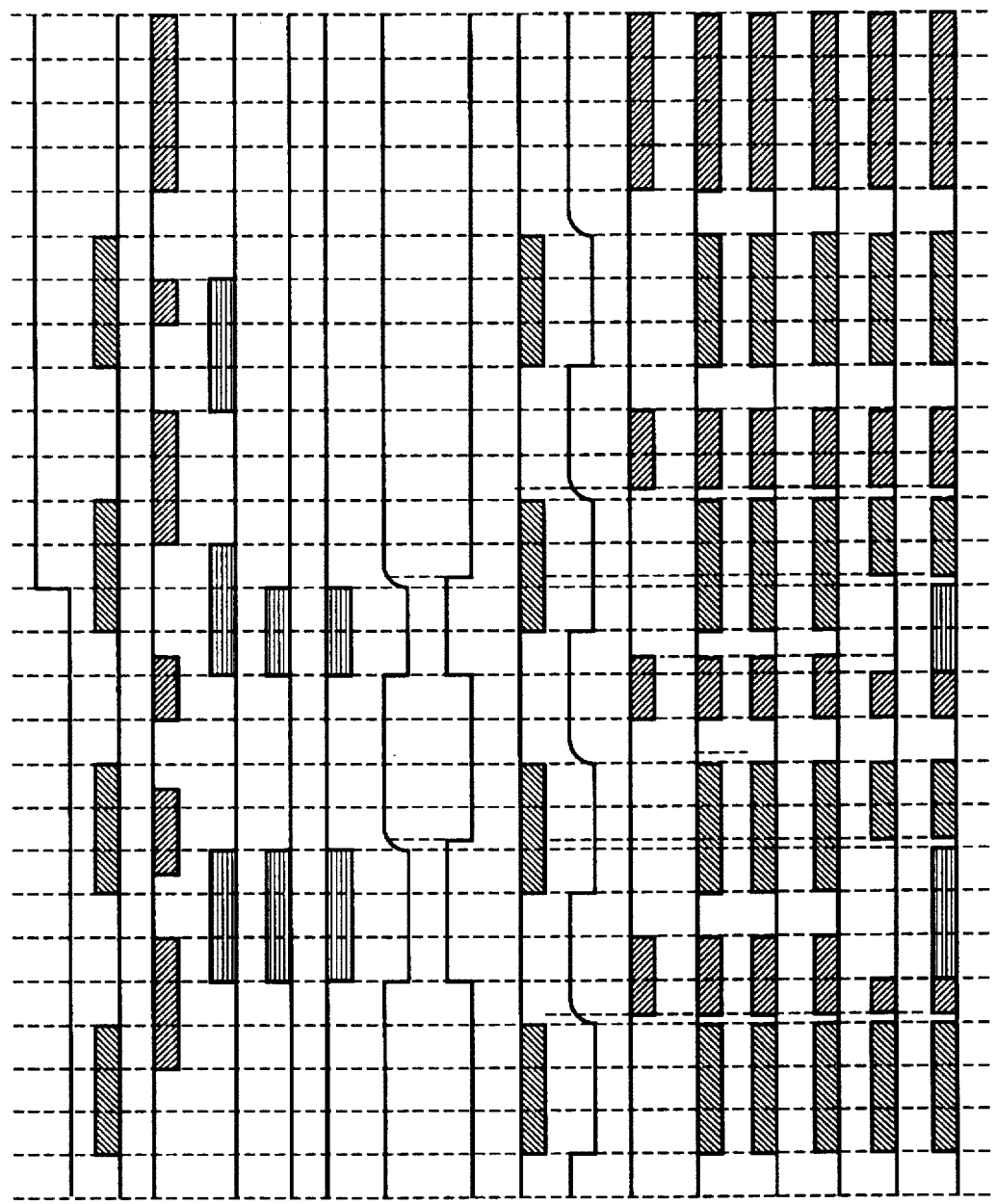
FIG_4

REMOTE RECEIVER THAT COORDINATES COMMAND SIGNALS FROM DIFFERING SOURCES INCLUDING RADIO FREQUENCY AND INFRARED SOURCES

BACKGROUND OF THE INVENTION

1. Field of the Invention

The present invention pertains to the fields of telecommunications and television systems. More particularly, this invention relates to a remote control receiver that coordinates commands signals from multiple sources including infrared and radio frequency sources.

2. Art Background

Prior electronic systems such as televisions, video recorders and players, and video or audio receivers commonly provide a remote control mechanism. Such remote control mechanisms typically enable users to control a variety of system functions from a distance. For example, prior television systems commonly include a hand-held remote control unit that enables channel selection and volume control as well as control over other functions. Similarly, prior video cassette recorders typically provide remote control units that enable remote control of record and playback functions as well as channel selection functions. In addition, prior audio systems commonly include remote control units that enable remote control of various functions of the audio system.

Some prior electronic systems provide remote control units that employ infrared signals for command communications. Such systems typically include a hand held remote infrared transmitter that communicates with an infrared receiver embedded in a control unit for the system. Typically, a user selects remote control functions from the hand held infrared transmitter which generates corresponding infrared signals. The infrared receiver in the control unit receives the infrared signals from the hand held transmitter which are then decoded. The decoded infrared signals are subsequently used to perform a remote control function in the control unit.

Such infrared based remote control units usually offer the advantage of relatively low cost for remote control of electronic systems. However, such infrared based communication typically imposes a limited range between the infrared transmitter and the corresponding infrared receiver. In addition, such infrared communication usually requires line of sight communication between the hand held transmitter and the control unit that contains the infrared receiver.

Other prior electronic systems employ radio frequency based remote control mechanisms. Typically in such systems, a hand held remote control transmitter generates radio frequency command signals in response to user selected functions. A control unit in such a system usually contains a radio frequency receiver that receives the radio frequency commands which are decoded and subsequently used for control functions.

Such radio frequency based remote control mechanisms typically provide increased communication range in comparison to infrared based remote control mechanisms. In addition, radio frequency communication is usually not limited to line of sight communication as is infrared communication. However, radio frequency based mechanisms typically impose higher system costs in comparison to infrared systems.

Some prior electronic systems may implement remote control mechanisms that employ both infrared and radio frequency communication. However, such systems typically include a mechanical switch that selects either the infrared or the radio frequency as the active communication link. Such mechanical switching is meant to eliminate the possibility of conflicting commands being received from the different remote transmitters. Unfortunately, such mechanical switches are unnecessarily cumbersome for the remote control of such electronic systems.

SUMMARY AND OBJECTS OF THE INVENTION

One object of the present invention is to provide a remote receiver that accepts remote command signals from a variety of sources.

Another object of the present invention is to provide a remote receiver that coordinates remote command signals from a variety of sources including infrared and radio frequency transmitters.

A further object of the present invention is to provide a remote receiver switching circuit that is responsive to infrared, radio frequency and closed circuit command sources.

Another object of the present invention is to enable programmable prioritization of the various remote command signals.

Another object of the present invention is to provide a remote receiver suitable for a wide variety of systems including video and audio systems.

These and other objects are provided by a remote receiver having circuitry that accepts a command signal from an infrared transmitter and a command signal from a radio frequency transmitter. The remote receiver combines the command signals into a final non overlapping command signal according to a preselected priority among the command signals. The remote receiver also accepts a control input signal via a signal line and combines the control input signal with the command signals from the infrared and radio frequency transmitters according to the preselected priority. For one embodiment, the preselected priority is determined by a control signal generated trader software control. The control signal either causes the command signal from the radio frequency transmitter to have highest priority or causes the command signal from the radio frequency transmitter to have no priority while combining the command signals.

Other objects, features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which:

FIG. 1 illustrates a video system for one embodiment that includes a satellite receiver which is controlled via differing remote command units;

FIG. 2 illustrates the satellite receiver for one embodiment which includes a microprocessor, a remote control switching circuit, and an infrared sensor;

FIG. 3 is a schematic diagram of the remote control switching circuit for one embodiment;

FIG. 4 is a timing diagram that illustrates the operation of the remote control switching circuit.

DETAILED DESCRIPTION

FIG. 1 illustrates a video system 10 for one embodiment. The video system 10 includes a satellite receiver 12 and a television monitor 14. The satellite receiver 12 provides a set of user controllable functions which are remotely controllable. The satellite receiver 12 receives and decodes command signals that originate from a variety of differing sources.

For one embodiment, the user controllable functions may be controlled via a radio frequency (RF) remote control unit 16 and an infrared (IR) remote control unit 18. The satellite receiver 12 receives command signals from the IR remote control unit 18 via an IR sensor 22. The IR sensor 22 converts infrared signals into electrical signals for command processing and decoding. The satellite receiver 12 includes an RF antenna 20 that receives command signals from the RF remote unit 16. The IR and RF command signals may conceivably originate from a single hand-held unit that contains both IR and RF transmitters.

In addition, the satellite receiver 12 accepts commands via a CONTROL_IN signal 24 from other electronic equipment such as video or audio equipment (not shown). The satellite receiver 12 in turn generates a CONTROL_OUT signal 26 to drive other video and audio equipment. The CONTROL_OUT signal 26 reflects command signals received by the satellite receiver 12 from either the RF remote control unit 16 or the IR remote control unit 18 or via the CONTROL_IN signal 24.

FIG. 2 illustrates the satellite receiver 12. The satellite receiver 12 includes a microprocessor 30, a remote control switching circuit 32, and the IR sensor 22. The remote control switching circuit 32 receives remote command signals via the CONTROL_IN signal 24 and via an RF_IN signal 20 from the RF antenna 20. The remote control switching circuit 32 also receives remote command signals via an IR_IN signal 28 from the IR sensor 22.

The microprocessor 30 generates an RF_CONTROL signal 40 for the remote control switching circuit 32. The RF_CONTROL signal 40 determines the priority of the RF_IN signal 20 in relation to the IR_IN signal 28 and the CONTROL_IN signal 24. The RF_CONTROL signal 40 is software controllable and either enables or disables remote control functions via the RF_IN signal 20 transmitted by the RF remote control unit 16. The RF_CONTROL signal 40, when low, selects the RF_IN signal 20 as the highest priority, followed by the CONTROL_IN signal 24 and then the IR_IN signal 28. The RF_CONTROL signal 40, when high, selects the CONTROL_IN signal 24 as the highest priority, followed by the IR_IN signal 28, while the RF_IN signal 20 is ignored.

The remote control switching circuit 32 combines the CONTROL_IN signal 24 with the RF_IN signal 20 and the IR_IN signal 28 according to the priority indicated by the RF_CONTROL signal 40. The remote control switching circuit 32 generates a FINAL_CONTROL signal 44 that provides a combination of the CONTROL_IN signal 24 with the RF_IN signal 20 sensed by the RF antenna 20 and the IR_IN signal 28 sensed by the IR sensor 22.

The remote control switching circuit 32 generates an RF_DETECT signal 42 that indicates whether a remote RF command signal is being received from the RF remote control unit 16 via the RF antenna 20. This is used by the microprocessor to decode the resulting command signal. The remote control switching circuit 32 also generates a CONTROL_OUT signal 26 as a combination of the CONTROL_IN signal 24 with the IR_IN signal 28 sensed by the IR sensor 22.

FIG. 3 is a schematic diagram of the remote control switching circuit 32 for one embodiment. FIG. 4 is a timing diagram that illustrates the operation of the remote control switching circuit 32. The remote control switching circuit 32 receives the RF_CONTROL signal 40 from the microprocessor 30 at a node N1. The RF_CONTROL signal 40 is software controllable via the microprocessor 30 to enable and disable remote commands from the RF remote control unit 16.

The remote control switching circuit 32 receives the CONTROL_IN signal 24 from external audio or video equipment at a node N2. The remote control switching circuit 32 receives the IR_IN signal 28 at a node N3 and the RF_IN signal 20 at a Node N4. A transistor Q151 either blocks or passes the RF_IN signal 20 under control of the RF_CONTROL signal 40 as indicated by the signal at a node N5 (FIG. 4). A transistor Q167 inverts the RF_IN signal 20 present at node N5 as shown at node N6.

The signal shown at node N7 (FIG. 4) results from an RC circuit comprised of a resistor R155 and a capacitor C157. The resistor R155 and the capacitor C157 yield a time constant, T=(1 megohm)×(1 microfarad) equal to 1 second, whenever the signal at the node N6 transitions from a low to a high level (for the high-to-low transition, the time constant is 1 micro farad×the inner resistance of the diode D100, which is very small. Therefore, the transition is sharp). Since the digital RF_IN signal 20 from the RF remote control unit 16 operates at a relatively high frequency in comparison to the time constant T, the signal at a node N7 remains near 0 volts while the RF remote control unit 16 is in use and the RF_IN signal 20 is active. When the RF_IN signal 20 transitions from active to inactive, the signal at node N6 reaches a high level.

A transistor Q169 converts the signal at node N7 into a digital signal at node N8 as shown in FIG. 4. The signal at node N8 is transferred to the microprocessor 30 as the RF_DETECT signal 42. The RF_DETECT signal 42 indicates active periods of the RF remote control unit 16.

The remote control switching circuit 32 receives the CONTROL_IN signal 24 at a node N2. A transistor Q155 inverts the CONTROL_IN signal 24 as shown at a node N10 (FIG. 4). An RC circuit comprising resistor R162 and capacitor C153 causes a time constant of approximately one second as indicated by a signal at a node N12 (FIG. 4). Whenever the signal at the node N10 switches from a low to a high voltage level, the RC circuit at node N12 slows down the transition. As a result, the signal at the node N12 stays low whenever the CONTROL_IN signal 24 is active. A transistor Q154 blocks out the IR_IN signal 28 received at node N3 while the CONTROL_IN signal 24 is active as indicated by the signal at the node N12 (FIG. 4).

The remote control switching circuit 32 combines the IR_IN signal 28 and the CONTROL_IN signal 24 at a node N11. As shown in FIG. 4, the signal at the node N11 is active whenever the CONTROL_IN signal 24 is high. If the CONTROL_IN signal 24 is low then a transistor Q155 will be switched off and the signal at a node N13 passes to the node N11. Since the IR_IN signal 28 at the node N13 is blocked whenever the CONTROL_IN signal 24 is active, it follows that the signal at the node N13 is always inactive while the signal at a node N10 is active. In addition, the signal at the node N13 is always active when the signal at the node N10 is inactive. The signal at the node N13 is inverted by a transistor Q153 as shown at a node N14 (FIG. 4).

At a node N9 (FIG. 4), the IR_IN signal 28 and the CONTROL_IN signal 24 are blocked whenever the RF_DETECT signal 42 is high in response to the RF_IN signal 20 being active.

The remote control switching circuit 32 generates the FINAL_CONTROL signal 44 at a node N16. The signal shown in FIG. 4 at the node N16 provides a combination of the RF_IN signal 20 at the node N5 and the IR_IN signal 28 and CONTROL_IN signal 24 at the node N9. Since the signal at the node N9 is never active while the signal at the node N5 is active and since the signal at the node N9 is never inactive while the signal at the node N5 is active, it follows that the transistors Q168 and Q152 function as a logical "or" gate. The transistors Q168 and Q152 taken together pass any high level command signal without interference among the various remote command signals received from the IR remote control unit 18 and the RF remote unit 16 and received via the CONTROL_IN signal 24.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than a restrictive sense.

What is claimed is:

1. A remote receiver comprising:

a first circuit that accepts a command signal from an infrared transmitter and a command signal from a radio frequency transmitter; and a second circuit that automatically combines the command signals into a final non overlapping command signal according to a preselected priority among the command signals.

2. A remote receiver comprising:

circuitry that accepts a command signal from an infrared transmitter and a command signal from a radio frequency transmitter and that combines the command signals into a final non overlapping command signal according to a preselected priority among the command signals; and circuitry that accepts a control input signal via a signal line and that combines the control input signal with the command signals from the infrared and radio frequency transmitters according to the preselected priority.

3. The remote receiver of claim 2, wherein the preselected priority is determined by a control signal generated by a microprocessor under software control.

4. A remote receiver comprising:

circuitry that accepts a command signal from an infrared transmitter and a command signal from a radio frequency transmitter; and circuitry that combines the command signals into a final non overlapping command signal according to a preselected priority among the command signals;

wherein the preselected priority is determined by a control signal generated by a microprocessor under software control, and wherein the control signal causes the command signal from the radio frequency transmitter to have highest priority while combining the command signals.

5. A remote receiver comprising:

circuitry that accepts a command signal from an infrared transmitter and a command signal from a radio frequency transmitter; and circuitry that combines the command signals into a final non overlapping command signal according to a preselected priority among the command signals;

wherein the preselected priority is determined by a control signal generated by a microprocessor under software control, and wherein the control signal causes the command signal from the radio frequency transmitter to have no priority while combining the command signals.

6. A video system, comprising:

an infrared transmitter that generates an infrared command signal;

a radio frequency transmitter that generates a radio frequency command signal; and a remote receiver that includes circuitry for receiving the infrared and the radio frequency command signals and for combining the infrared and the radio frequency command signals into a final non overlapping command signal according to a preselected priority among the command signals wherein the final command signal controls the video system, said remote receiver determining said priority.

7. The video system of claim 6, wherein the video system includes a microprocessor that controls the preselected priority by generating a control signal for the remote receiver under software control.

8. A video system, comprising:

an infrared transmitter that generates an infrared command signal;

a radio frequency transmitter that generates a radio frequency command signal; and a remote receiver that includes circuitry for receiving the infrared and the radio frequency command signals and for combining the infrared and the radio frequency command signals into a final non overlapping command signal that controls the video system according to a preselected priority among the command signals, wherein the remote receiver includes circuitry that receives a control input signal via a signal line and that combines the control input signal with the infrared and the radio frequency command signals according to the preselected priority.

9. A video system, comprising:

an infrared transmitter that generates an infrared command signal;

a radio frequency transmitter that generates a radio frequency command signal;

a remote receiver that includes circuitry for receiving the infrared and the radio frequency command signals and for combining the infrared and the radio frequency command signals into a final non overlapping command signal that controls the video system according to a preselected priority among the command signals; and a microprocessor that controls the preselected priority by generating a control signal for the remote receiver under software control, wherein the control signal causes the radio frequency command signal to have highest priority while combining the command signals.

10. A video system, comprising:

an infrared transmitter that generates an infrared command signal;

a radio frequency transmitter that generates a radio frequency command signal;

a remote receiver that includes circuitry for receiving the infrared and the radio frequency command signals and for combining the infrared and the radio frequency command signals into a final non overlapping command signal that controls the video system according to a preselected priority among the command signals; and a microprocessor that controls the preselected priority by generating a control signal for the remote receiver under software control wherein the control signal causes the radio frequency command signal to have no priority while combining the command signals.

11. A remote control method, comprising the steps of:
concurrently generating an infrared command signal and a radio frequency command signal;
combining the infrared and the radio frequency command signals into a final non overlapping command signal according to a preselected priority among the command signals; and
controlling an electronic system with the final command signal.

12. The method of claim 11, wherein the preselected priority is determined under software control in the electronic system.

13. A remote control method, comprising the steps of:
generating an infrared command signal and a radio frequency command signal; and
combining the infrared and the radio frequency command signals into a final non overlapping command signal that controls an electronic system according to a preselected priority among the command signals, wherein the step of combining the infrared and the radio frequency command signals further comprises the steps of receiving a control input signal via a signal line and combining the control input signal with the infrared and the radio frequency command signals according to the preselected priority.

14. A remote control method, comprising the steps of:
generating an infrared command signal and a radio frequency command signal;
combining the infrared and the radio frequency command signals into a final non overlapping command signal according to a preselected priority among the command signals; and
controlling an electronic system with the final command signal, wherein the preselected priority is determined under software control in the electronic system;
wherein the preselected priority causes the radio frequency command signal to have highest priority while combining the command signals.

15. A remote control method, comprising the steps of:
generating an infrared command signal and a radio frequency command signal;
combining the infrared and the radio frequency command signals into a final non overlapping command signal according to a preselected priority among the command signals; and
controlling an electronic system with the final command signal, wherein the preselected priority is determined under software control in the electronic system, and wherein the preselected priority causes the radio frequency command signal to have no priority while combining the command signals.

16. A remote receiver comprising:
circuitry configured to accept a command signal from an infrared transmitter and a command signal from a radio frequency transmitter; and
circuitry configured to automatically combine the command signals into a final non overlapping command signal according to a preselected priority among the command signals.

17. A remote receiver comprising:
circuitry configured to accept a command signal from an infrared transmitter and a command signal from a radio frequency transmitter; and
circuitry configured to automatically combine the command signals into a final non overlapping command signal according to a preselected priority among the command signals;
the receiver configured to accept a control input signal via a signal line and to combine the control input signal with the command signals from the infrared and radio frequency transmitters according to the preselected priority.

18. The remote receiver of claim 17, wherein the preselected priority is determined by a control signal generated by a microprocessor under software control.

19. A remote receiver comprising:
circuitry configured to accept a command signal from an infrared transmitter and a command signal from a radio frequency transmitter; and
circuitry configured to automatically combine the command signals into a final non overlapping command signal according to a preselected priority among the command signals;
wherein the preselected priority is determined by a control signal generated by a microprocessor under software control and wherein the control signal causes the command signal from the radio frequency transmitter to have highest priority while combining the command signals.

20. A remote receiver comprising:
circuitry configured to accept a command signal from an infrared transmitter and a command signal from a radio frequency transmitter; and
circuitry configured to automatically combine the command signals into a final non overlapping command signal according to a preselected priority among the command signals;
wherein the preselected priority is determined by a control signal generated by a microprocessor under software control and wherein the control signal causes the command signal from the radio frequency transmitter to have no priority while combining the command signals.

21. A video system, comprising:
an infrared transmitter configured to generate an infrared command signal;
a radio frequency transmitter configured to generate a radio frequency command signal;
a remote receiver that includes circuitry configured to receive the infrared and the radio frequency command signals and to automatically combine the infrared and the radio frequency command signals into a final non overlapping command signal that controls the video system according to a preselected priority among the command signals.

22. The video system of claim 21, wherein the video system includes a microprocessor configured to automatically control the preselected priority by generating a control signal for the remote receiver under software control.

23. A video system, comprising:
an infrared transmitter configured to generate an infrared command signal;
a radio frequency transmitter configured to generate a radio frequency command signal; and
a remote receiver having circuitry configured to receive the infrared and the radio frequency command signals and to combine the infrared and the radio frequency command signals into a final non overlapping command signal according to a preselected priority among the command signals wherein the final command signal controls the video system, wherein the remote receiver includes circuitry configured to receive a control input signal via a signal line and to combine the control input signal with the infrared and the radio frequency command signals according the preselected priority.

24. A video system, comprising:

an infrared transmitter configured to generate an infrared command signal;

a radio frequency transmitter configured to generate a radio frequency command signal; and a remote receiver that includes circuitry configured to receive the infrared and the radio frequency command signals and to combine the infrared and the radio frequency command signals into a final non overlapping command signal according to a preselected priority among the command signals wherein the final command signal controls the video system; and a microprocessor configured to control the preselected priority by generating a control signal for the remote receiver under software control, wherein the control signal causes the radio frequency command signal to have highest priority while combining the command signals.

25. A video system, comprising:

an infrared transmitter configured to generate an infrared command signal;

a radio frequency transmitter configured to generate a radio frequency command signal; and a remote receiver that includes circuitry configured to receive the infrared and the radio frequency command signals and to combine the infrared and the radio frequency command signals into a final non overlapping command signal according to a preselected priority among the command signals wherein the final command signal controls the video system; and a microprocessor configured to control the preselected priority by generating a control signal for the remote receiver under software control, wherein the control signal causes the radio frequency command signal to have no priority while combining the command signals.

* * * * *

UNITED STATES PATENT AND TRADEMARK OFFICE
CERTIFICATE OF CORRECTION

PATENT NO.   :   5,675,395
DATED        :   October 7, 1997
INVENTOR(S)  :   Martin et al.

It is certified that error appears in the above-identified patent and that said Letters Patent is hereby corrected as shown below:

In column 2 at line 39 delete "trader" and insert --under--

Signed and Sealed this

Thirtieth Day of December, 1997

Attest:

BRUCE LEHMAN

Attesting Officer

Commissioner of Patents and Trademarks